2,867,344
MOUNTING ARRANGEMENT FOR SWITCH BOXES AND THE LIKE

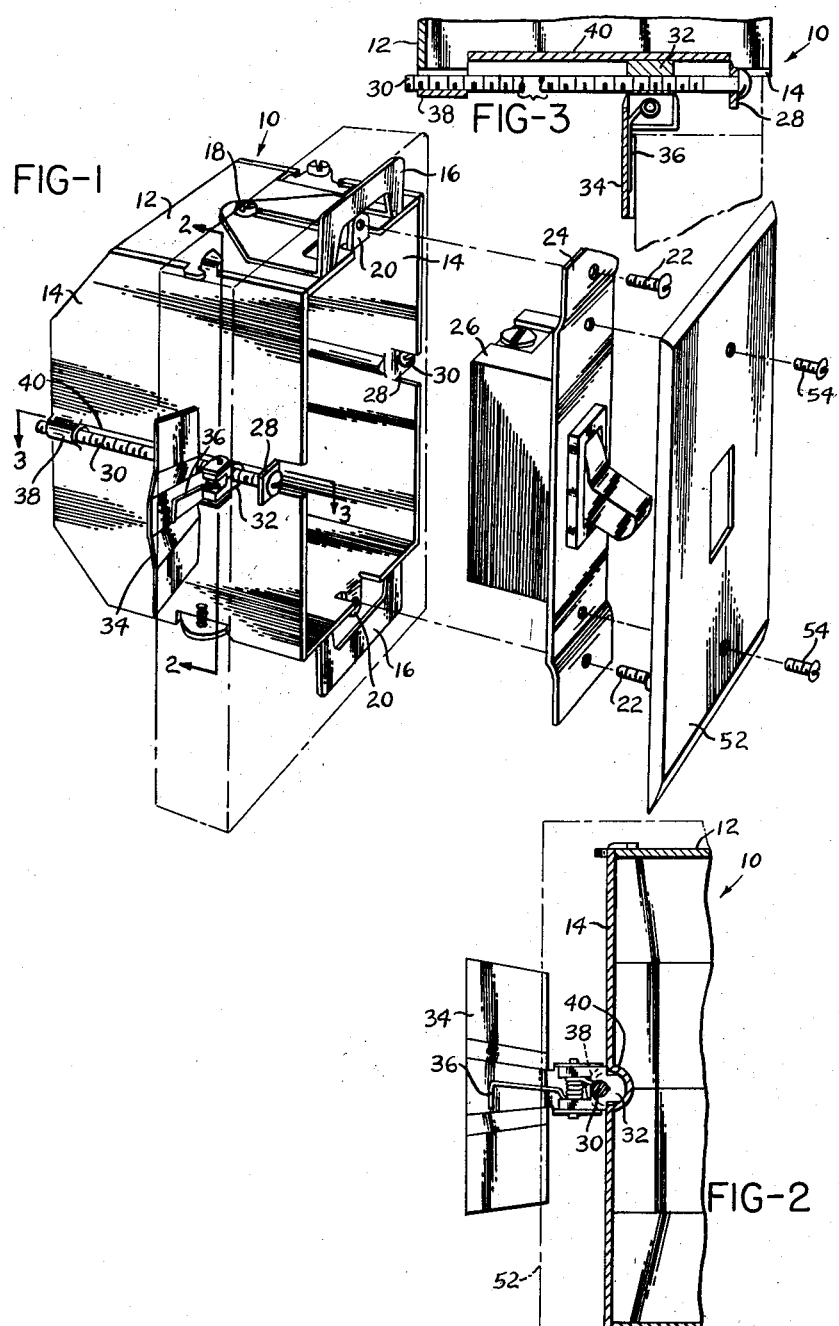

Edward C. Nickell, Franklin, Ohio

Application March 16, 1956, Serial No. 572,161

1 Claim. (Cl. 220—3.6)

This invention relates to a mounting arrangement for switch boxes, bathroom fixtures, and other appurtenances that are ordinarily mounted in an aperture in a wall or the like.

The usual manner of mounting switch boxes in a wall is to prepare a mounting support for the switch box in an opening in the wall before the wall is finally plastered, as in the case of a new construction, or to cut an opening in the wall and secure the switch box to the lathe of the wall structure, as in the case of an old construction.

In either case it is not always possible to have an adequate support for the switch box readily available from the wall structure itself, and this many times involves the addition of supporting elements within the wall structure to which the switch box can be fastened.

In the case of an old construction it is quite often extremely difficult to establish the proper sort of supporting arrangement between the wall and the switch box due to the fact that the box might be inserted in a space between studding where the latter would be imperfectly supported thereby making an imperfect support for the switch box.

The same comments pertain to bathroom fixtures, such as soap holders, towel racks, and the like, of the recessed type. With these latter articles there is often an additional support provided in the wall for receiving screws in the bottom of the recessed fixture. Such a support can be supplied fairly readily in a new construction, but it will be evident that with an old construction the provision of such a support is attendant with difficulties.

Having the foregoing in mind, it is a primary object of the present invention to provide a mounting arrangement for switch boxes, bathroom fixtures, and other fixtures and the like adapted for being mounted in openings in walls that will eliminate the difficulties referred to above.

Another object of the present invention is the provision of an inexpensive mounting arrangement adapted for forming an integral part of the fixture to be mounted, and which is readily adjustable to any particular mounting conditions which might be encountered.

A further object of the present invention is the provision of a mounting arrangement which will permit the location of a switch box, a fixture, or the like in substantially any desired location in a wall without regard to the location in the wall of the studding, or lathe, or the like.

These and other objects and advantages of this invention will become more apparent upon reference to the following specification taken in connection with the accompanying drawings, in which:

Figure 1 is a perspective view showing a switch box constructed according to the present invention;

Figure 2 is a sectional view indicated by line 2—2 on Figure 1; and

Figure 3 is another sectional view indicated by line 3—3 on Figure 1.

Referring to the drawings somewhat more in detail, there is shown in Figure 1, at 10, a substantially conventional box in which switches or electrical outlets are placed. Box 10 comprises a generally U-shaped wall part 12, the ends of which are closed by the detachable side plates 14; wall 12 and plate 14 forming an enclosure in which the switch or outlet is located. One or both of wall 12 and plate 14 are provided with knock-out or pry-out disks through which the electric wires lead to and from the unit mounted within the box.

At opposite ends of box 10 are the angular clips 16 adjustably retained in position on the end portions of wall 12 of the box, as by the screws 18. Clips 16 form means for engaging the outer face of a wall to provide a bearing for the box.

The ends of the wall 12 are also formed with the turned-out aperture and threaded tabs 20 adapted for receiving screws 22 that pass through apertures in the ends of mounting plate 24 forming a part of switch 26 or wherever a unit is mounted within the box.

According to the present invention the side plates 14 are formed with at least turned-out and apertured tabs 28 through which pass an elongated screw 30, and on which screw is mounted a nut 32 having pivotally secured thereto a wing 34. Wing 34 is adapted for folding against the screw toward the front of the box, but will fold backwardly only to the position of the screw in which it is illustrated in Figure 1. The combination of the nut 32 and the wing 34 pivoted thereto may be termed a "toggle nut."

A torsion spring 36 may be provided for normally holding the wing outwardly for permitting it to yield forwardly when necessary. The side plates 14 may also be provided with turned-out tabs or struck-out portions 38 that receive and support the ends of screws 30 opposite the heads thereof. It will be evident that the provision of portion 38 is, many times, optional and is not essential to the proper operation of the box structure, according to this invention, after it has been mounted within a wall opening.

In utilizing the device according to the present invention an aperture is cut in the wall in which the device is to be placed, and the box is then inserted into the opening, the wings 34 of the toggle nuts yielding forwardly at this time to permit the box to enter the opening, whereupon the wings will again spring outwardly. After the clips 16 are engaged against the outer face of the wall, screws 30 are turned to draw up the toggle nuts so as to pull the wings 34 up tightly against the back of the wall, thus pressing the box fixedly in place.

Bathroom fixtures of any sort can likewise be attached to a wall in the same manner. It will be apparent that for small fixtures two screws may suffice, but for larger fixtures, such as medicine cabinets, it will be necessary to supply four or more screws in order to obtain a suitably strong support for the fixture.

It will also be apparent that in certain cases as, for example, where the box or fixture may come out adjacent a stud or between adjacent studs so close thereto that the wings 34 of the toggle nuts will not spring out to their Figure 1 position, the wings may be cut off, as with an electrician's side cutters or the like, so as to be somewhat shorter, and thereupon the wings will dig into the member in the side of the box or fixture and provide support therefor.

As will be seen in Figures 2 and 3, side plates 14 may be provided with axially extending recesses 40 that will permit the screws 30 and nut portions 32 of the toggle nuts to be placed closer to the sides of the box than would otherwise be possible. Similarly, the side plates may be slotted if so desired and this would permit the screws and nuts to be placed even more nearly within the confines of the box than is illustrated.

The arrangement illustrated in Figure 1 also preferably comprises a decorative and protective escutcheon plate 52 adapted for being retained in position as by the screws 54, and it will be understood that the attaching device of the present invention, so far as the heads of the screw 30 and the tabs 28 are concerned, are so located as to be well within the confines of the escutcheon plate.

It will be understood that this invention is susceptible to modification in order to adapt it to different usages and conditions, and accordingly it is desired to comprehend such modifications within this invention as may fall within the scope of the appended claim.

I claim:

As a new article of manufacture, a side plate for an electric outlet or switch box, a tab turned out from the front edge of the box and apertured, a screw extending through the aperture, and a toggle nut on the screw, said side plate being formed to present a groove for the nut to slide in, and said plate supportingly engaging the end of the screw opposite said tab.

References Cited in the file of this patent

UNITED STATES PATENTS

| | | |
|---|---|---|
| 1,593,910 | Patch | July 27, 1926 |
| 1,957,003 | Selen | May 1, 1934 |
| 2,081,323 | Cordes | May 25, 1937 |
| 2,299,696 | Gregersen | Oct. 20, 1942 |
| 2,334,799 | Thompson | Nov. 23, 1943 |
| 2,616,327 | Karitzky | Nov. 4, 1952 |